Figure 1:
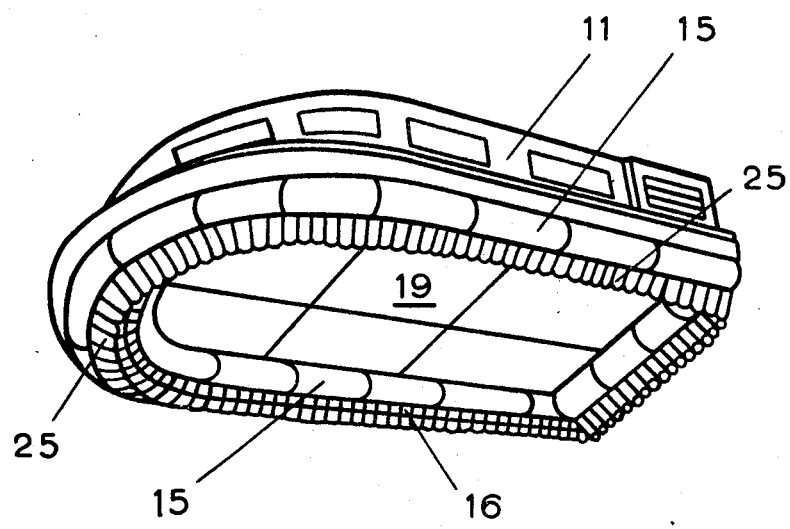

United States Patent

Winter

[15] 3,643,758
[45] Feb. 22, 1972

[54] SKIRTS FOR AIR CUSHION VEHICLES
[72] Inventor: Anthony Winter, Sandown, England
[73] Assignee: British Houercraft Corporation Limited, Somerset, England
[22] Filed: Sept. 9, 1970
[21] Appl. No.: 70,230

[30] Foreign Application Priority Data

Sept. 15, 1969 Great Britain......................45,376/69

[52] U.S. Cl..............................................180/128, 180/124
[51] Int. Cl..........................................................B60v 1/16
[58] Field of Search..................................180/127, 128, 124

[56] References Cited

UNITED STATES PATENTS

| | | | |
|---|---|---|---|
| 3,211,246 | 10/1965 | Lewis | 180/127 |
| 3,265,144 | 8/1966 | Shaw | 180/127 |
| 3,502,168 | 3/1970 | Jones | 180/127 |
| 3,536,156 | 10/1970 | Crago | 180/128 |

Primary Examiner—A. Harry Levy
Attorney—Larson, Taylor & Hinds

[57] ABSTRACT

An air cushion vehicle wherein the cushion is bounded in part by a skirt including a plurality of segments extending from the rigid structure of the vehicle and includes a flexible diaphragm extending between and secured to the webs and arcuate part of each segment, the diaphragm extending from a position centrally of the arcuate part to the inner upper edge of each web. The diaphragm, together with the segment and the rigid structure of the vehicle, forms an inflatable compartment separate from the fluid cushion.

10 Claims, 5 Drawing Figures

SKIRTS FOR AIR CUSHION VEHICLES

This invention relates to vehicles which receive support from one or more cushions of pressurized fluid, and is more particularly concerned with flexible skirts for such vehicles.

British Pat. No. 952,772 (U.S. Pat. No. 3,211,246) discloses a flexible skirting constructed from sheets of flexible material folded to form a plurality of corrugations. Each corrugation has an outer arcuate part concave towards the supporting cushion and two webs extending, one from each side of the arcuate part, into the cushion area, the upper edge of each corrugation being secured around the underside of the periphery of the rigid structure of the vehicle. Greater flexibility and ease of maintenance is achieved when the webs of adjacent corrugations are not joined, such an arrangement being claimed in claim 5 of British Pat. No. 952,772. These discrete corrugations have become known in the art as either "fingers" or "segments" and will be referred to as segments throughout this specification. Subsequent experience has shown that operational benefits are derived when the segments depend from upper flexible structure, for example, an inflated baglike member.

One of the characteristics required by a skirt for a fluid cushion supported vehicle is that it should be able to flex readily to conform to the surface over which the vehicle is operating or to ride over an obstacle in the vehicle's path.

Another desirable characteristic of a fluid cushion supported vehicle skirt is that its flexibility should be progressive so that it is most flexible at its lowest part and least flexible at its highest part. This characteristic of vertically progressive flexibility is useful in that, when small obstacles are encountered, only the lower part of the skirt moves. It is an object of the invention to provide segments possessing these characteristics.

According to the invention I provide a vehicle which receives support from at least one cushion of pressurized fluid, the cushion or cushions being bounded in part by a skirt including a plurality of segments extending from rigid structure of the vehicle, wherein at least one flexible diaphragm extends between, and is secured to, the webs and the arcuate part of each segment, the diaphragm extending from a position on the arcuate part intermediate the upper edge and the lower tip of the arcuate part in a direction first inwardly towards the fluid cushion and then upwardly towards the inner upper edge of each web to form with the segment and the rigid structure of the vehicle at least one inflatable compartment separate from the fluid cushion.

In another form of the invention I provide a vehicle which receives support from at least one cushion of pressurized fluid, the cushion or cushions being bounded in part by a skirt including a plurality of segments and an upper flexible part, wherein at least one flexible diaphragm extends between, and is secured to, the webs and the arcuate part of each segment, the diaphragm extending from a position on the arcuate part intermediate the upper edge and the lower tip of the arcuate part in a direction first inwardly towards the fluid cushion and then upwardly towards the inner upper edge of each web to form, in cooperation with the segment and the upper flexible part of the skirt, at least one inflatable compartment separate from the fluid cushion.

The upper part of the skirt may consist of a pressurized baglike member inflated by pressurized fluid. By the use of the term "pressurized fluid" I mean air, gas or other suitable gaseous fluid mixture.

Figure 2:
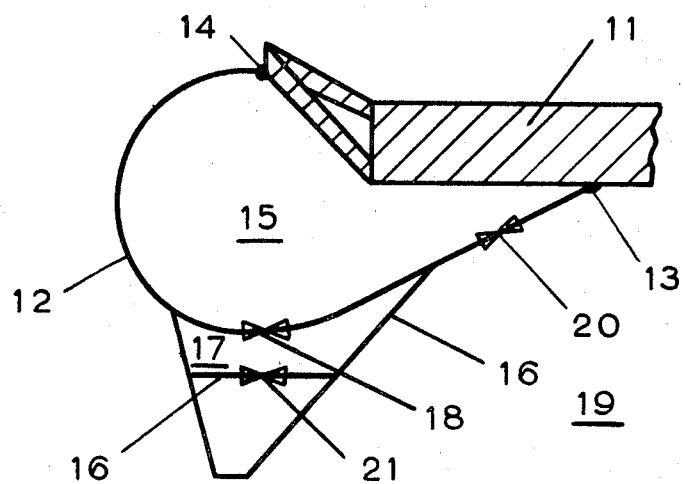
Figure 3:
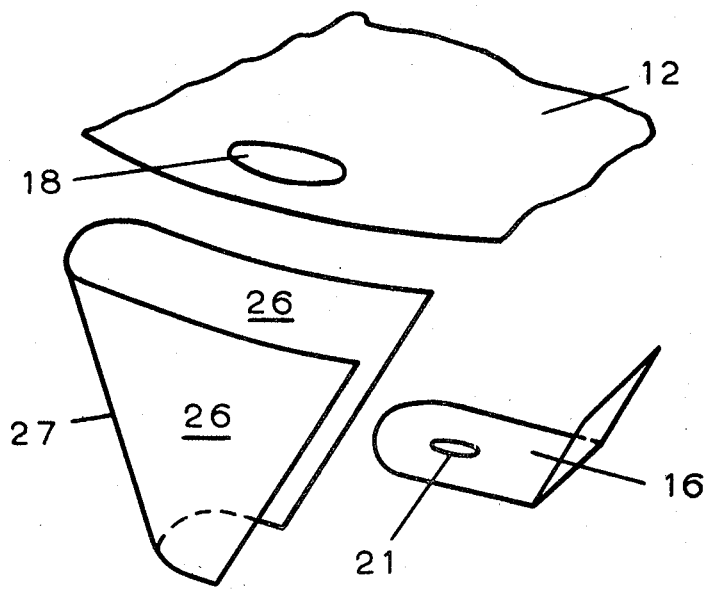
Figure 4:
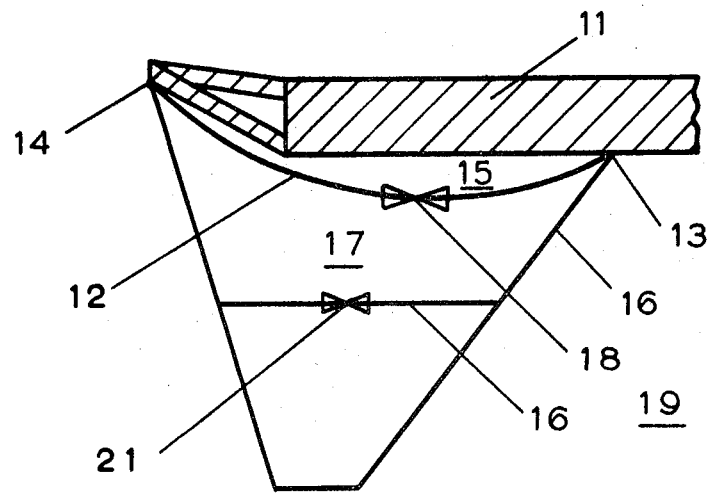
Figure 5:
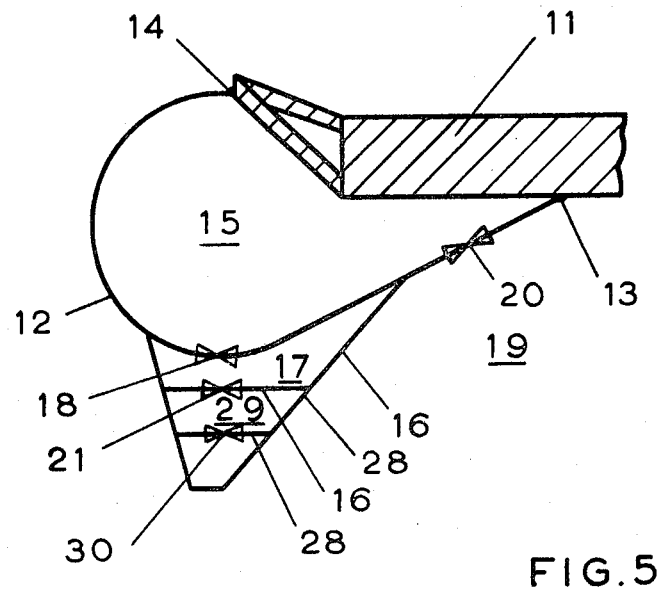

The invention will now be described by way of example, with reference to the accompanying drawings, in which:

FIG. 1 is a perspective view, looking from below, of an air cushion vehicle according to one embodiment of the invention, FIG. 2 is a diagrammatic section of part of the skirt of the vehicle illustrated in FIG. 1, FIG. 3 is an exploded view of some of the components illustrated in FIG. 2, FIG. 4 is a diagrammatic section of another example of the embodiment shown in FIG. 2, and FIG. 5 is a diagrammatic section of a further embodiment of the invention.

FIG. 1 illustrates an air cushion vehicle having rigid body structure 11 supported by at least one air cushion situated in an air cushion area 19. The air cushion area 19 is bounded in part by a flexible skirt constructed according to one form of the invention. The skirt includes an upper baglike member 15 and a plurality of discrete segments 25.

FIG. 2 is a transverse cross section through the skirt and part of the rigid body structure of FIG. 1, and FIG. 3 is an exploded view of the skirt components of FIG. 2. A sheet 12 of flexible impermeable material is attached to the rigid body structure 11 at inner and outer attachment lines 13 and 14 respectively, and inflated to form an upper baglike member 15. Each segment extending below the member 15 has a flexible impermeable diaphragm 16 attached in an airtight manner to the webs 26 and the arcuate part 27. The diaphragm is attached to the arcuate part intermediate its upper and lower edges and extends in a direction first inwardly towards the air cushion area and then in an upward and inward direction relative to the air cushion area at the inner edges of the webs 26. The diaphragm 16 forms, in cooperation with part of the sheet 12 and the segment 25, a compartment 17. The compartment 17 may be inflated to a pressure higher than that of the air cushion area. Preferably each compartment 17 is inflated by air from the upper baglike member 15 by way of orifices 18.

The upper baglike member 15 is inflated by air from one or more lift fans (not shown) from which the air is conducted by ducts (not shown) in the rigid body. From the upper baglike member 15 the air may flow directly to the air cushion area 19 by way of orifices 20 which are remote from the segments and/or it may pass through the compartment 17 and by way of orifices 21 in the diaphragms 16 to the lower part of the segments and thence to the air cushion area 19. The diaphragms 16 divide each segment into two parts, the upper part being a compartment 17, which is pressurized, the pressure depending upon the relative sizes of the orifice 18 in which air enters the compartment and the orifice 21 by which air leaves the compartment.

FIG. 4 illustrates another example of the embodiment shown in FIG. 2. In FIG. 4 the sheet 12 is shorter than the sheet 12 in FIG. 2, and produces a smaller baglike member 15. This permits larger segments and provides for a larger compartment 17.

Another embodiment of the invention is illustrated in FIG. 5. A second flexible impermeable diaphragm 28 extends between the webs and arcuate part of each segment in a manner similar to the flexible impermeable diaphragm 16. The second flexible impermeable diaphragm 28 is continued in an upward and inward direction until it reaches the flexible impermeable diaphragm 16 and forms a second compartment 29. The compartment 29 is inflated by air from the compartment 17 by way of the orifice 21 in the diaphragm 16. An orifice 30 allows the air to flow from the compartment 29 to the lower part of the segment and thence to the air cushion area 19. Again, the pressure in the compartment 29 will depend upon the relative sizes of the orifices 18, 21 and 30. These may be arranged so that the pressure in the compartment 17 is less than the pressure in the baglike member 15, and the pressure in the compartment 29 is less than the pressure in the compartment 17, all three of these pressures being higher than that of the cushion.

In operation, each segment receives support, which gives the segment stiffness, from the webs extending into the cushion area. The lower parts of the segments are subject to cushion pressure which gives them an inherent stiffness. The upper parts of the segments, in the form of inflatable compartments, are inflated to a pressure higher than that in the cushion area, and this higher pressure gives a stiffness greater than the lower parts. When two or more compartments are provided at different pressures the stiffness is increased in incremental steps.

I claim as my invention:

1. A vehicle which receives support from at least one cushion of pressurized fluid, the cushion or cushions being bounded in part by a skirt including a plurality of segments extending from rigid structure of the vehicle, wherein at least one flexible diaphragm extends between, and is secured to, the webs and the arcuate part of each segment, the diaphragm extending from a position on the arcuate part intermediate the upper edge and the lower tip of the arcuate part in a direction first inwardly towards the fluid cushion and then upwardly towards the inner upper edge of each web to form, with the segment and the rigid structure of the vehicle, at least one inflatable compartment separate from the fluid cushion.

2. A vehicle as claimed in claim 1, wherein each compartment is inflatable to a pressure higher than that of the fluid cushion.

3. A vehicle as claimed in claim 2, wherein two or more compartments are formed with each segment and each of these compartments is inflated to a different pressure.

4. A vehicle which receives support from at least one cushion of pressurized fluid, the cushion or cushions being bounded in part by a skirt including a plurality of segments and an upper flexible part, wherein at least one flexible diaphragm extends between, and is secured to, the webs and the arcuate part of each segment, the diaphragm extending from a position on the arcuate part intermediate the upper edge and the lower tip of the arcuate part in a direction first inwardly towards the fluid cushion and then upwardly towards the inner upper edge of each web to form, in cooperation with the segment and the upper flexible part of the skirt, at least one inflatable compartment separate from the fluid cushion.

5. A vehicle as claimed in claim 4, wherein each compartment is inflated by fluid from the upper part of the skirt by way of orifices in the upper part of the skirt.

6. A vehicle as claimed in claim 5, wherein the fluid is supplied to the cushion by way of orifices in the upper part of the skirt remote from the segments.

7. A vehicle as claimed in claim 5, wherein the fluid is supplied to the cushion from the compartments by way of orifices in the diaphragms.

8. A vehicle as claimed in claim 5, wherein fluid flows to the cushion from both the upper part of the skirt and the compartments.

9. A vehicle as claimed in claim 4 wherein each compartment is inflatable to a pressure higher than that of the fluid cushion.

10. A vehicle as claimed in claim 9 wherein two or more compartments are formed with each segment and each of these compartments is inflated to a different pressure.

* * * * *